E. STEMPERT.
MACHINE FOR MILLING THE FLAT FACES OR SIDES OF NUTS AND BOLT HEADS.
APPLICATION FILED MAR. 16, 1915.
1,198,967.
Patented Sept. 19, 1916.
4 SHEETS—SHEET 2.
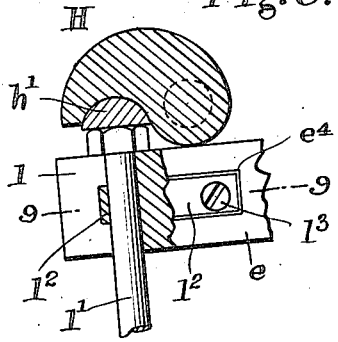
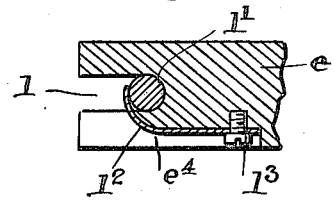
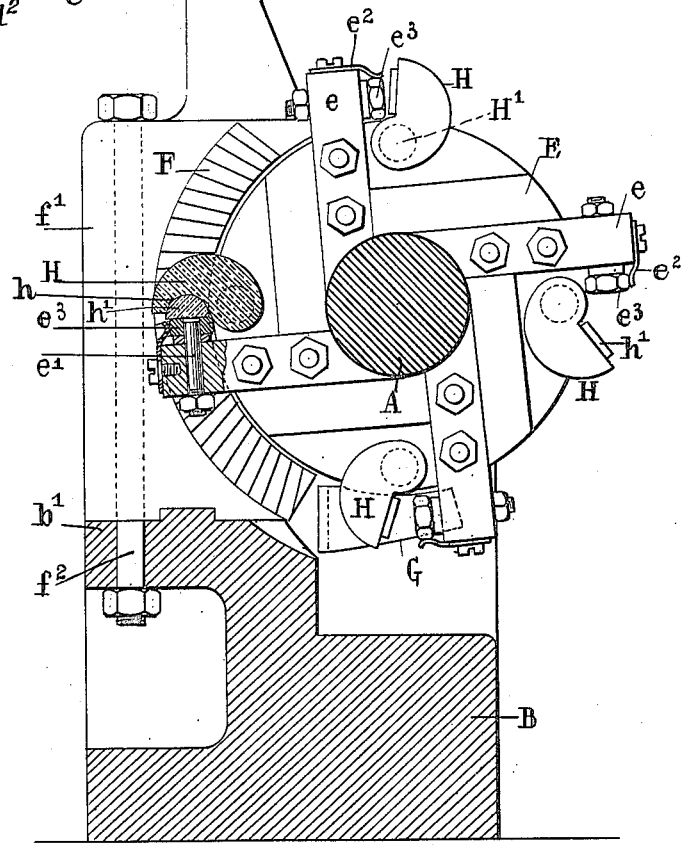
WITNESSES
INVENTOR
Emile Stempert
BY
Johnson and Johnson
his ATTORNEYS E. STEMPERT.
MACHINE FOR MILLING THE FLAT FACES OR SIDES OF NUTS AND BOLT HEADS.
APPLICATION FILED MAR. 16, 1915.

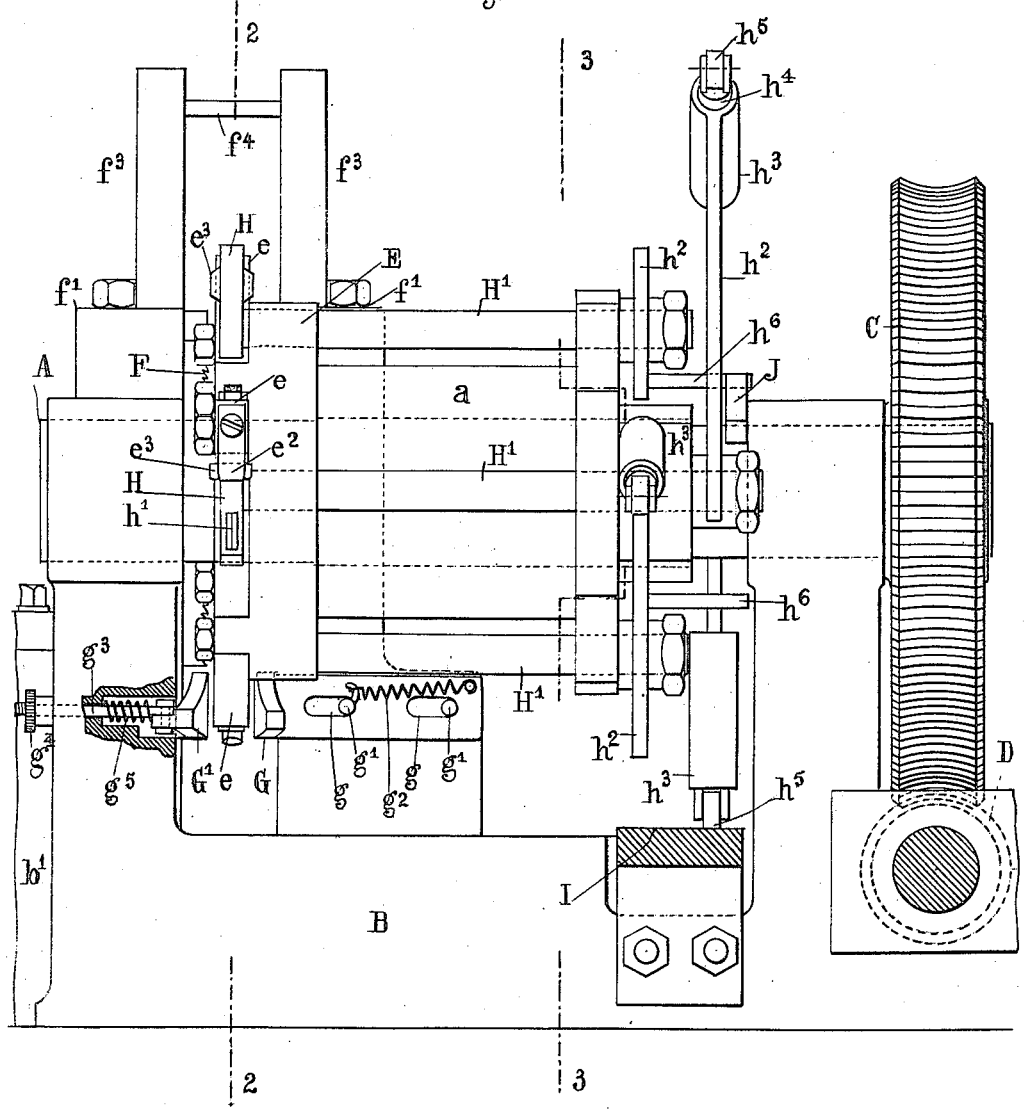

1,198,967. Patented Sept. 19, 1916.
4 SHEETS—SHEET 3.

Witness:

Inventor.
Emile Stempert.
by his Attorneys,

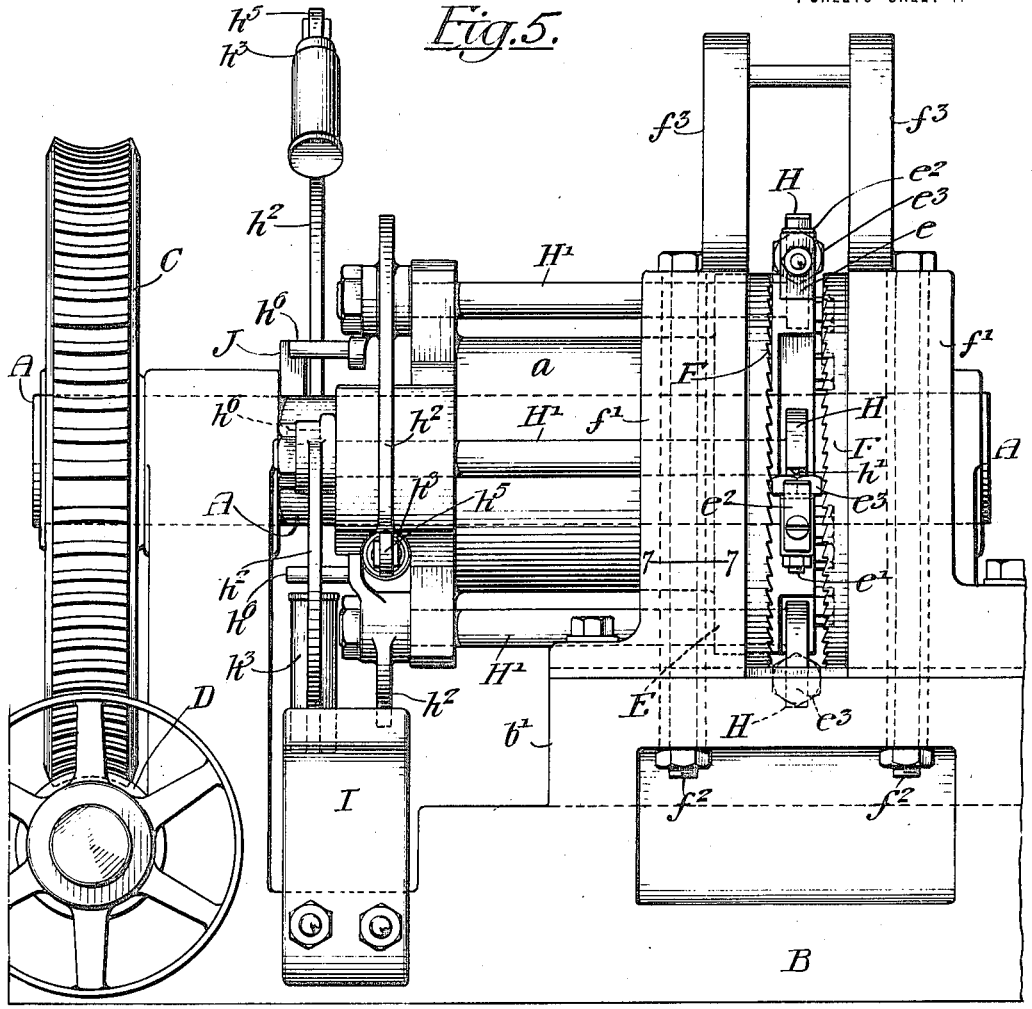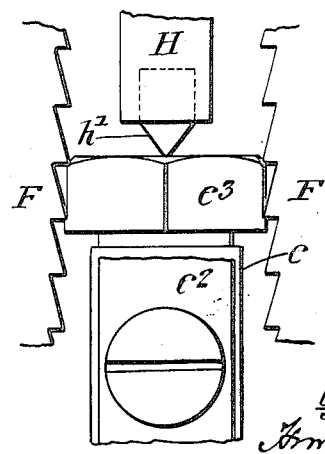

UNITED STATES PATENT OFFICE.

EMILE STEMPERT, OF VIRY-CHATILLON, FRANCE.

MACHINE FOR MILLING THE FLAT FACES OR SIDES OF NUTS AND BOLT-HEADS.

1,198,967.  Specification of Letters Patent.  Patented Sept. 19, 1916.

Application filed March 16, 1915.  Serial No. 14,726.

*To all whom it may concern:*

Be it known that I, EMILE STEMPERT, a citizen of the Republic of France, and a resident of 2 and 4 Rue de Seine, Viry-Chatillon, Seine and Oise, France, have invented a new and useful Machine for Milling the Flat Faces or Sides of Nuts and Bolt-Heads, of which the following is a specification.

This invention has for its second object a machine for shaping or milling the flat faces or sides of nuts and of the heads of bolts. In this machine, the nuts pass between two fixed milling cutters arranged in the arc of a circle, which simultaneously effect the milling of two opposite sides or flats. In order that the nuts may be presented correctly in front of the milling cutters, the machine is furnished with a system of set squares which true the position of the nut before its entrance between the milling cutters; the nut is afterward made immovable on its supporting stud or mandrel by means of a system of levers mechanically controlled.

Figure 3:
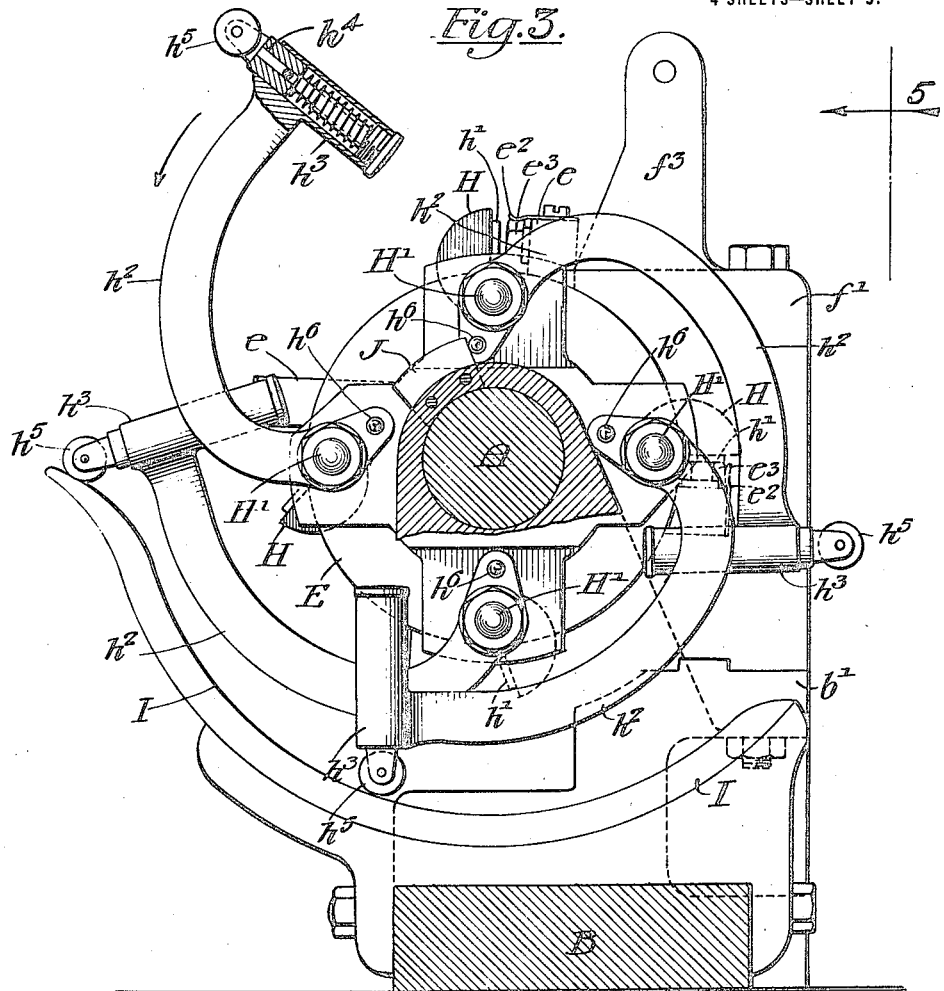
Figure 4:
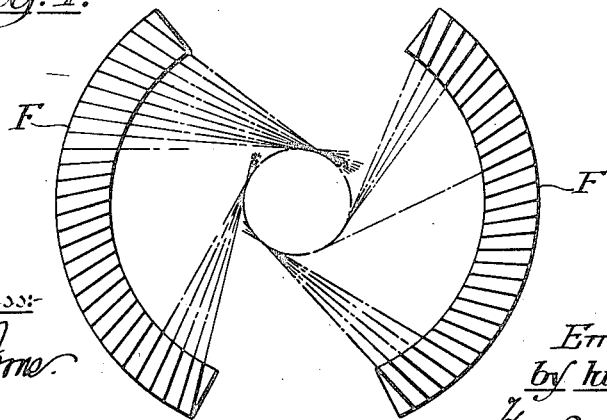

A form of carrying out the invention has been shown by way of example on the annexed drawing, in which:

Figure 1 represents an elevation of the machine, Fig. 2 a section on line 2—2 of Fig. 1 seen from the left, Fig. 3 is a vertical section on the line 3—3, Fig. 1; Fig. 4 is a diagram illustrating the manner in which the position of the teeth on the cutters may be determined; Fig. 5 is a side elevation looking in the direction indicated by the arrow in Fig. 3; Fig. 6 is an enlarged elevation of a portion of the cutters showing a nut passing between the same;
Fig. 7 is a partial cross section through the block $f^1$ on the line 7—7, Fig. 5, showing the adjusting slot $f^{11}$ through which the bolt $f^2$ passes; Fig. 8 is a partial vertical section through one rotary carrier $e$ showing the latter modified to receive a bolt; and Fig. 9 is a horizontal section therethrough on the line 9—9, Fig. 8.

A horizontal shaft A mounted on a frame B having at the rear part a bed $b^1$, is rotated by means of a worm wheel C and a worm D. Upon the shaft A is keyed a drum $a$ which carries on one side a plate E upon which are fixed four arms $e$; these arms $e$ are furnished with studs or mandrels $e^1$ to carry the nuts $e^3$, which latter are previously screw-threaded and trued or shaped upon one face. Spring arms $e^2$ hold the nuts in place during the rotation of the shaft A.

The milling cutters F between which pass the nuts $e^3$ to be milled are fixed by bolts on blocks $f^1$. The blocks $f^1$ are rendered immovable upon the bed $b^1$ of the machine by holding-down bolts $f^2$; the holes $f^{11}$ (Fig. 7) formed in the blocks $f^1$ for the passage of these holding-down bolts are made oval with a view to allowing the milling cutters F to be adjustably spaced apart, according to the diameter of the nuts which it is intended to shape. Two uprights $f^3$ cast with the block $f^1$ are connected together by a cross member $f^4$ which insures the rigidity of the spacing between the two milling cutters F.

The mills F, of special steel, have their teeth so cut that when the flat face or side of the nut or bolt-head is about to leave one tooth, the succeeding tooth commences its engagement; there is therefore no shock during work.

The angles of the teeth of the two opposed arcuate milling cutters should be the same, but with the teeth oppositely faced however. These angles may be ascertained by arranging the segments equi-distant and on opposite sides of a circle of appropriate diameter and drawing equally spaced tangents on the faces of the cutters, substantially as shown in Fig. 4.

The nuts $e^3$ must be delivered properly positioned when being entered between the milling cutters. For this purpose two set squares G and $G^1$ having their inner faces parallel to the plane of the cutters and having a cut-away portion, are arranged, the one G upon the block $f^1$, the other $G^1$ upon the left upright of the frame. The square G is provided with two oval holes $g$ in which enter two retaining pins $g^1$ screwed into the block $f^1$; a coiled spring $g^2$ tends to pull the square G to the left. The square $G^1$ is mounted on two rods $g^3$ screwed at the end and furnished with milled nuts $g^4$; two coiled springs $g^5$ (of which only one is shown in Fig. 1) tend to force this square $G^1$ to the right.

The nuts $e^3$, during the whole of the work, are rendered immovable on the supporting studs $e^1$. For this purpose, each stud $e^1$ has a corresponding lever H keyed at one end to a shaft $H^1$ and fitted with a recess $h$ in which can move a semi-circular plate $h^1$.

To the other extremity of the shaft $h^1$ is keyed a lever $h^2$ in the shape of an arc of a circle, ending in a socket $h^3$ in which can move a piston $h^4$. This piston is provided with a roller $h^5$ capable of bearing during the appropriate position of the lever, upon a trackway I carried by the frame A. The lever $h^2$ is fitted at its other extremity with a stop pin $h^6$ which can make contact with a cam J fixed to the frame B.

The working of this machine is the following:—The nuts are slipped upon the mandrels $e^1$ at the time of their passage to the upper part of the machine: the springs $e^2$ hold in place the nuts which afterward pass between the arms of the set squares G and $G^1$ which position them correctly. At this moment the roller $h^5$ of the lever $h^2$ corresponding with the nut which is between the squares G and $G^1$ comes into contact with the trackway I: the movement of the lever $h^2$ effects the rotation of the shaft $H^1$ and that of the lever H which through the intermediary of the plate $h^1$ bears upon the upper face of the nut to be shaped; the plate $h^1$ by reason of its mobility in the recess $h$ bears exactly upon the face of the nut, whatever be the direction of this face. The contour or shape of the trackway I is such that the holding fast of the nut on its stud $e^1$ takes place during the whole of the passage of the nut between the milling cutters, that is to say the roller $h^5$ remains in contact with the trackway during the whole of this period. When the roller $h^5$ has left the trackway I, the stop pin $h^6$ comes into contact with the cam J, which movement causes the lifting of the lever $h^2$. At this moment the stud $e^1$ is at the upper part of its stroke and the nut is no longer held except by the plate spring $e^2$; it is then possible to turn the nut through 60° to effect the milling of two other flat faces, or to replace the nut if the six faces are milled. The same succession of operations takes place for each nut and at each turn of the shaft A.

It is possible by changing the arms $e$ to perform the milling of the sides of bolt-heads. Thus as shown in Figs. 8 and 9 each arm $e$ may be radially slotted at $l$ into which the stem $l^1$ of the bolt may be thrust. The bolt is secured in position by a plate spring $l^2$ set into a recess $e^4$ in the side of the arm and secured by the screw $l^3$. The head of the bolt is gripped by the hemispherical plate $h^1$ carried by the lever H in precisely the same manner as a nut, as above described.

Suitable bolt holes are afforded if the studs $e^1$ are removed from the arms $e$.

It is evident that the invention is not limited to the exemplified method of carrying it out above described except as defined by the appended claims; thus for instance the machine may comprise any desired number of arms $e$ each fitted with a stud $e^1$.

What I claim and desire to secure by Letters Patent of the United States is:

1. In a machine of the character described, a pair of opposed, stationary, arcuate cutters spaced apart and a rotary carrier having means for supporting a plurality of nut blanks and passing the same successively between and in cutting engagement with said stationary cutters whereby each nut is cut simultaneously on opposite faces.

2. In a machine of the character described, a pair of opposed, stationary, arcuate cutters, means for adjustably spacing the same apart to accommodate nut blanks of different sizes and a rotary carrier having means for supporting a plurality of nut blanks and passing the same successively between and in cutting engagement with said stationary cutters whereby each nut is cut simultaneously on opposite faces.

3. In a machine of the character described, a pair of stationary arcuate cutters spaced apart and a rotary carrier for passing a nut blank between said cutters, said carrier comprising a seat for the nut blank, a presser for holding the blank to said seat and a cam operating-lever device for holding said presser against the nut blank during the travel of the latter in engagement with the cutters.

4. In a machine of the character described, a pair of stationary arcuate cutters spaced apart and a rotary carrier for passing a nut blank between said cutters, said carrier comprising a seat for the nut blank, a friction clip at said seat to temporarily hold the blank in position thereon, and a presser for holding the blank to said seat and a cam operating lever device for holding said presser against the nut blank during the travel of the latter in engagement with the cutters.

5. In a machine of the character described, a pair of opposed, stationary arcuate cutters, a rotary drum arranged on the axis of said cutters, seats mounted at one end of said drum for supporting a plurality of nut blanks, pressers for holding said blanks to said seats and means at the opposite end of the drum for actuating said pressers successively to hold their respective blanks firmly to their seats during the passage thereof between the arcuate cutters.

6. In a machine of the character described, a pair of opposed stationary arcuate cutters, a rotary drum arranged on the axis of said cutters, seats mounted at one end of said drum for supporting a plurality of nut blanks, pressers for holding said blanks to said seats and means at the opposite end of the drum for actuating said pressers successively to hold their respective blanks firmly to their seats during the passage thereof between the arcuate cutters, said means comprising a series of pivoted levers operatively connected at one end to said pressers and bearing at their other ends during a portion of the travel of the drum upon a suitable cam-way serving to force the pressers against their respective seats.

7. In a machine of the character described, a pair of opposed stationary arcuate cutters spaced apart and a rotary carrier for supporting and carrying a series of nut blanks between said cutters, in combination with a pair of yielding guides arranged at the working entrance to the cutters to properly position the nut blank with relation thereto.

In testimony whereof I have signed my name to this specification, in the presence of two subscribing witnesses.

EMILE STEMPERT.

Witnesses:
 JOSEPH BERGERON,
 TRACY LAY.